United States Patent
Matsumoto et al.

(10) Patent No.: US 8,813,552 B2
(45) Date of Patent: Aug. 26, 2014

(54) DETECTING APPARATUS

(75) Inventors: Seiichi Matsumoto, Toyota (JP); Hiroyuki Kawaki, Toyota (JP); Shinya Kamada, Toyota (JP); Yasunori Toyoshima, Okazaki (JP); Masayuki Kitamura, Kuwana (JP); Takahiro Makihara, Ama (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 222 days.

(21) Appl. No.: 13/254,492

(22) PCT Filed: Aug. 3, 2009

(86) PCT No.: PCT/JP2009/003674
§ 371 (c)(1),
(2), (4) Date: Sep. 2, 2011

(87) PCT Pub. No.: WO2011/013180
PCT Pub. Date: Feb. 3, 2011

(65) Prior Publication Data
US 2012/0111103 A1    May 10, 2012

(30) Foreign Application Priority Data

Jul. 28, 2009   (JP) ................................ 2009-175647

(51) Int. Cl.
*H01M 4/04*     (2006.01)
(52) U.S. Cl.
USPC ............... 73/150 R; 73/433; 73/573; 73/580; 73/590; 73/596; 73/606; 73/632; 356/630

(58) Field of Classification Search
USPC ............ 73/32 A, 32 R, 150 R, 433, 569, 573, 73/580, 590, 596, 606, 632; 356/630
See application file for complete search history.

(56) References Cited

U.S. PATENT DOCUMENTS 3,470,734 A * 10/1969 Bertil et al. .................... 73/32 A
4,612,807 A *  9/1986 Wunderer ....................... 73/580
(Continued)

FOREIGN PATENT DOCUMENTS

CN      1967222     5/2007
JP      1-145564    6/1989
(Continued)

OTHER PUBLICATIONS

International Search Report in International Application No. PCT/JP2009/003674; Mailing Date: Oct. 20, 2009.

*Primary Examiner* — Hezron E Williams
*Assistant Examiner* — Alexander Mercado
(74) *Attorney, Agent, or Firm* — Finnegan, Henderson, Farabow, Garrett & Dunner, LLP

(57) ABSTRACT

The objective of the present invention is to provide an unexpected detecting apparatus enabled to evaluate an evenness of a compound coated on an electrode of a battery. The detecting apparatus (1) detects an evenness of a compound (12) coated on an electrode (10) of a battery, and includes a first sensor (20) for measuring a mass per unit area of the compound (12) in any points thereof, a second sensor (30, 50) for measuring a thickness of the compound (12) in the any points, and a holder (40, 60) for holding the first and second sensors (20, 30, 50), in which the first and second sensors (20, 30, 50) measure the mass and thickness at the same time, and the evenness is evaluated on the basis of the measured mass and thickness.

5 Claims, 2 Drawing Sheets

(56) References Cited

U.S. PATENT DOCUMENTS

| | | | |
|---|---|---|---|
| 5,587,051 A * | 12/1996 | Ostermayer et al. | 162/198 |
| 5,691,474 A * | 11/1997 | Gerz | 73/580 |
| 5,922,960 A * | 7/1999 | Toda | 73/597 |
| 6,374,469 B1 * | 4/2002 | Baudry et al. | 28/107 |
| 6,393,915 B1 * | 5/2002 | Banet et al. | 73/579 |
| 6,407,964 B1 * | 6/2002 | Hornung et al. | 367/138 |
| 6,441,905 B1 * | 8/2002 | Tojyo et al. | 356/429 |
| 6,763,721 B2 * | 7/2004 | Wunderer et al. | 73/602 |
| 7,184,147 B2 * | 2/2007 | Sperling | 356/445 |
| 7,469,589 B2 * | 12/2008 | Pradel | 73/602 |
| 7,748,274 B2 * | 7/2010 | Pellaton et al. | 73/649 |
| 8,045,868 B2 * | 10/2011 | Kuramochi et al. | 399/45 |
| 8,237,084 B2 * | 8/2012 | Varriano-Marston et al. | 219/121.72 |
| 2007/0034008 A1 | 2/2007 | Voss | |
| 2012/0067128 A1 * | 3/2012 | Oberhoff et al. | 73/632 |
| 2012/0247211 A1 * | 10/2012 | Matsumoto et al. | 73/632 |

FOREIGN PATENT DOCUMENTS

| | | | | |
|---|---|---|---|---|
| JP | 3-162645 | | 7/1991 | |
| JP | 10128236 A | * | 5/1998 | B06B 3/00 |
| JP | 11-211647 | | 8/1999 | |
| JP | 2002-296250 | | 10/2002 | |
| JP | 2003293182 A | * | 10/2003 | C25C 7/02 |
| JP | 2006-147338 | | 6/2006 | |
| JP | 2007-37550 | | 2/2007 | |
| JP | 2007-173114 | | 7/2007 | |

* cited by examiner

DETECTING APPARATUS

CROSS-REFERENCE TO RELATED APPLICATIONS

This application is a national phase application of International Application No. PCT/JP2009/003674, filed Aug. 3, 2009, and claims the priority of Japanese Application No. 2009-175647, filed Jul. 28, 2009, the contents of both of which are incorporated herein by reference.

TECHNICAL FIELD

The present invention relates to a detecting apparatus for detecting a compound coated on an electrode of a battery.

BACKGROUND ART

An electrode of a battery is made by the following processes; coating a paste compound made by compounding an active material, a conductive additive, a binder and the like with a diluent on a surface of a collector made of aluminum, copper, or the like, drying, and roll pressing.

As stated above, the compound is made from multiple materials such as the active material, the binder and the like. Unfortunately, if the compound is coated on the collector such that the multiple materials are not mixed evenly in the compound, variation in the electrode performance increases and dendrites are generated. Therefore, it is necessary to detect whether the compound is coated on the collector such that the multiple materials are scattered evenly in the compound or not (to detect an evenness of the compound).

Patent Literature 1 discloses that the evenness of the compound is evaluated by irradiating the electrode with x-ray, and calculating a mass per unit area of each of multiple parts of the compound from the permeation volume of the x-ray.

However, in Patent Literature 1, the evenness of the compound is evaluated on the basis of one measurement value, namely only the mass per unit area of the compound calculated from the permeation volume of the x-ray, so that when the compound is judged as uneven, it is impossible to identify whether the unevenness of the compound is caused by a change of a thickness of the compound or by a change of a mixing ratio of the multiple materials in the compound.

Moreover, a measurement apparatus using the x-ray has a poor resolution and such apparatus has a disadvantage in a quality control of the electrode, because the performance of the electrode depends on the evenness of the compound.
[Patent Literature 1] JP 2006-147338 A

DISCLOSURE OF INVENTION

Problems to be Solved by the Invention

The objective of the present invention is to provide an unexpected detecting apparatus enabled to evaluate an evenness of a compound coated on an electrode of a battery.

Means for Solving the Problems

The first embodiment of the present invention is a detecting apparatus for detecting an evenness of a compound coated on an electrode of a battery, which includes a first sensor for measuring a mass per unit area of any part of the compound, a second sensor for measuring a thickness of any part of the compound, a holder for holding the first and second sensors, and an evaluation device for evaluating the evenness of the compound, in which the first and second sensors measure the mass per unit area and thickness of a same part of the compound at the same time, and the evaluation device evaluates the evenness of the compound on the basis of the measured mass per unit area and thickness.

In the advantageous embodiment of the detecting apparatus, the holder has an opening formed as a semi-sphere on a surface thereof facing to the electrode, and the first and second sensors are arranged in the opening.

In the preferable embodiment of the detecting apparatus, the evaluation device evaluates the evenness of the compound by comparing a coated density calculated from the measured mass per unit area and thickness with a threshold.

In the more preferable embodiment of the detecting apparatus, the evaluation device evaluates the evenness of the compound by comparing the measured mass per unit area and thickness with thresholds in addition to comparing the coated density.

In the desirable embodiment of the detecting apparatus, the first sensor is an ultrasonic through beam sensor, and the second sensor is a laser displacement meter.

Effect of the Invention

According to the present invention, the evenness of the compound in the electrode is specifically evaluated. Furthermore, the result feedback to the manufacturing step provides low variation in the battery performance.

Figure 1:
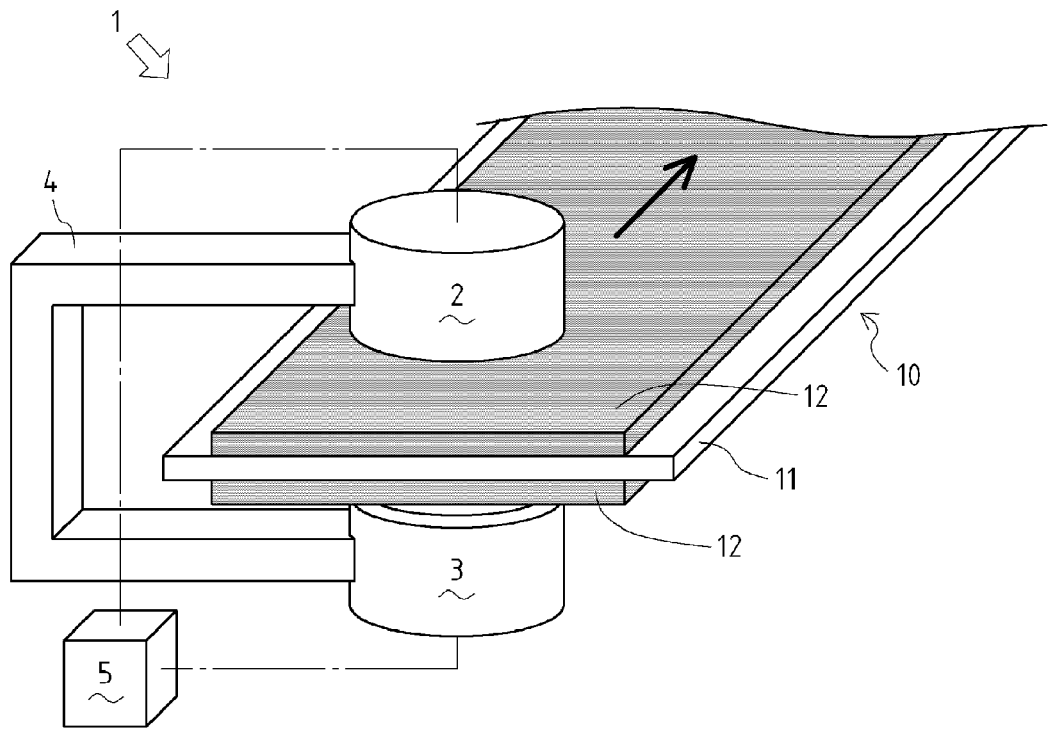
FIG. 1 is a perspective view of a detecting apparatus.

REFERENCE SIGNS LIST 1 detecting apparatus
2 upper sensor
3 lower sensor
5 evaluation device
10 electrode
11 collector
12 compound
20 ultrasonic sensor(first sensor)
30, 50 laser displacement meter(second sensor)
40, 60 holder

THE BEST MODE FOR CARRYING OUT THE INVENTION

A detecting apparatus 1 as an embodiment of the present invention is described below with reference to FIGS. 1 to 3.

The detecting apparatus 1 uses two sensors: a first sensor for measuring a mass per unit area of a detecting object; and a second sensor for measuring a thickness of the detecting object to evaluate evenness of the detecting object on the basis of the measured values or of a mass per unit volume (density) calculated from the measured values. In detail, the detecting apparatus 1 calculates the mass per unit volume (density) of compounds 12 coated on the both sides of an electrode 10, and determines whether the compounds 12 are coated on a collector 11 in the electrode 10 evenly or not on the basis of the mass per unit volume (density).

The electrode 10 is a long sheet and made by the following processes: coating the paste compound 12 on the both sides of the collector 11 with the die coater or the like; drying; and roll pressing. The electrode 10 is, for example, used as an electrode of a lithium-ion rechargeable battery, a Ni-MH rechargeable battery or the like. The electrode 10 is conveyed in the longitudinal direction (arrow direction in FIG. 1) by a conveyor (not shown) such as a set of rollers or the like.

The collector 11 is a metal web made of aluminum, copper, titanium, stainless steel or the like.

The compound 12 is a paste compound made by compounding an active material, a conductive additive, a binder and the like with a diluent.

As shown in FIG. 1, the detecting apparatus 1 has an upper sensor 2, a lower sensor 3, an arm 4, and an evaluation device 5.

In the following description, the arrow shown in FIG. 1 directs a "conveyance direction" of the electrode 10, and the horizontally perpendicular direction to the conveyance direction (left-right direction in FIG. 2) is defined as a "width direction" of the electrode 10.

The sensors 2, 3 are a pair of sensors for measuring predetermined data of the compounds 12 in the electrode 10. The sensors 2, 3 face through the electrode 10, and are arranged over and under the electrode 10 respectively. The sensors 2, 3 are fixed to the both ends of the arm 4 respectively.

The arm 4 supports and connects the sensors 2, 3, and is formed such that the arm doesn't contact the electrode 10 when the sensors 2, 3 move in the width direction of the electrode 10, for example, the arm has supporting portions, to which the sensors 2, 3 are attached, having the same length as the width of the electrode 10 or more, and the supporting portions are joined at the opposite ends to the attached side.

Thus, the sensors 2, 3 are supported by the arm 4 such that the sensors maintain the space therebetween, and are able to move reciprocally within prescribed range along the width direction of the electrode 10 (the range of the electrode 10 on which the compounds 12 are coated) with constantly maintaining the distance to the electrode 10.

The evaluation device 5 is connected with the sensors 2, 3, obtains the data measured by the sensors, and evaluates on the basis of the data whether the compounds 12 are coated on the electrode 10 evenly.

Figure 2:
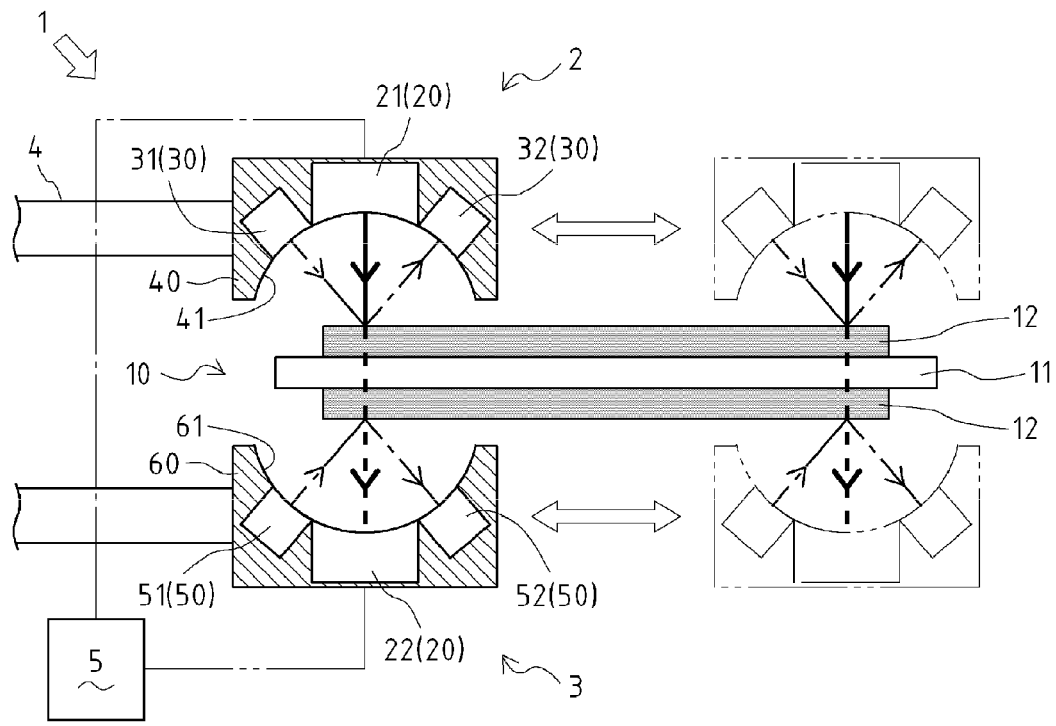
FIG. 2 is a sectional view perpendicular to the conveyance direction.
Figure 3:
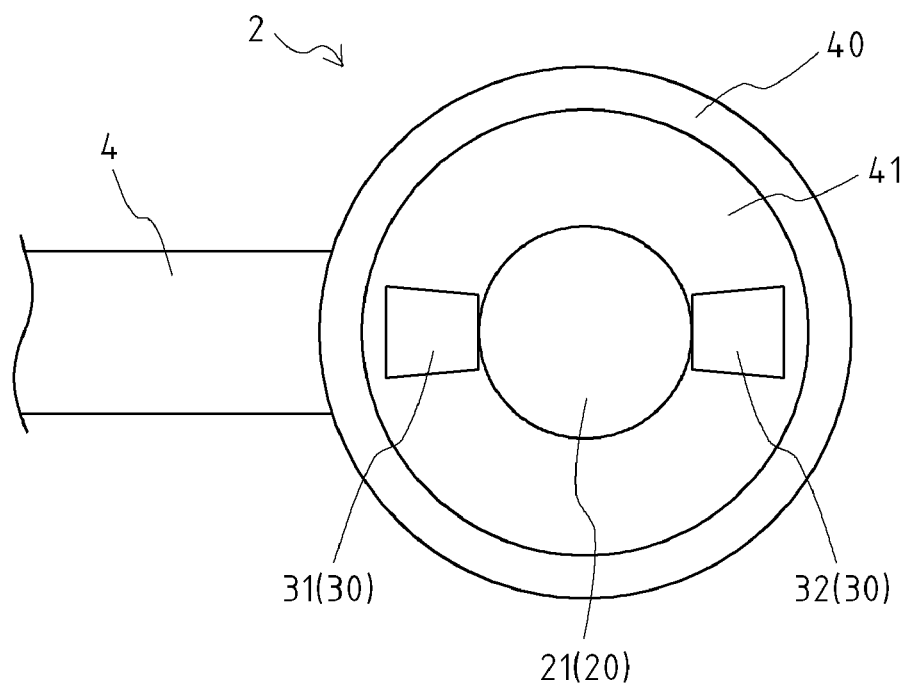
FIG. 3 is a bottom view of an upper sensor.

As shown in FIGS. 2 and 3, the upper sensor 2 has an ultrasonic sensor 20 including an ultrasonic oscillator 21, a laser displacement meter 30, and a holder 40 that holds the ultrasonic oscillator 21 and the laser displacement meter 30.

The ultrasonic sensor 20 is configured as an ultrasonic through beam sensor that has the ultrasonic oscillator 21 and an ultrasonic receiver 22, and the ultrasonic oscillator 21 and the ultrasonic receiver 22 face through the electrode 10. The ultrasonic oscillator 21 and the ultrasonic receiver 22 are arranged such that ultrasonic waves transmitted from the ultrasonic oscillator 21 penetrate the electrode 10 and are received by the ultrasonic receiver 22. In detail, the ultrasonic oscillator 21 is attached to the holder 40 of the upper sensor 2, and the ultrasonic receiver 22 is attached to a holder 60 of the lower sensor 3.

The ultrasonic sensor 20 transmits ultrasonic waves to any part of the electrode 10 with the ultrasonic oscillator 21, receives the ultrasonic waves that penetrate the electrode 10 with the ultrasonic receiver 22, and calculates a mass per unit area (hereinafter called "coated mass") [g/cm$^2$] of any part of the compounds 12 from the quantity of the penetrated ultrasonic waves through the electrode 10, and outputs the coated mass as the data measured by the ultrasonic sensor 20.

Note that pulse wave having low frequency (e.g. 100 kHz) is applied to the ultrasonic wave transmitted from the ultrasonic oscillator 21 such that the ultrasonic wave propagates easily in air.

The laser displacement meter 30 has a laser irradiator 31 and a laser receiver 32, and is attached to the holder 40 of the upper sensor 2.

The laser displacement meter 30 irradiates a laser to the prescribed part of the compound 12 on one surface of the electrode 10 (the upper side compound 12 in FIG. 2) with the laser irradiator 31, receives the reflected laser with the laser receiver 32, and measures a thickness [μm] of the prescribed part of the upper side compound 12 (length of the prescribed part of the upper side compound 12 in the top-bottom direction in FIG. 2; hereinafter called "coated thickness").

The holder 40 is a substantially column member to define the outer profile of the upper sensor 2, and holds the ultrasonic oscillator 21 of the ultrasonic sensor 20 and the laser displacement meter 30 (the laser irradiator 31 and the laser receiver 32). The holder 40 has an opening 41 on one end face (face facing to the electrode 10; the bottom face in FIG. 2).

The opening 41 is formed by boring the surface of the holder 40 toward the inner portion from the one end face. The opening 41 is formed as a semi-sphere, and has the ultrasonic oscillator 21 in the center thereof.

Hereby, the ultrasonic waves transmitted from the ultrasonic oscillator 21 reflect on the inner surface of the semi-sphere opening 41 and are concentrated on the center, whereby the ultrasonic waves are transmitted to the desired part of the electrode 10 without dispersing.

Moreover, the laser irradiator 31 and the laser receiver 32 are arranged on either side of the ultrasonic oscillator 21, and slope along the shape of the opening 41.

Hereby, the ultrasonic sensor 20 and the laser displacement meter 30 can measure the coated mass [g/cm$^2$] and the coated thickness [μm] of the same part of the upper side compound 12.

Thus, by the holder 40, the ultrasonic oscillator 21 and the laser displacement meter 30 are held and arranged in the semi-sphere opening 41, thereby detecting the same part of the upper side compound 12.

The lower sensor 3 is composed as the same as the upper sensor 2, and has the ultrasonic receiver 22 of the ultrasonic sensor 20, a laser displacement meter 50, and a holder 60 that holds the ultrasonic receiver 22 and the laser displacement meter 50.

The laser displacement meter 50 is composed as the same as the laser displacement meter 30, has a laser irradiator 51 and a laser receiver 52, and is attached to the holder 60 of the lower sensor 3.

The laser displacement meter 50 measures the coated thickness [μm] of the prescribed part of the compound 12 on the other surface of the electrode 10 (the lower side compound 12 in FIG. 2) as the same as the laser displacement meter 30.

The holder 60 is composed as the same as the holder 40, is a substantially column member to define the outer profile of the lower sensor 3, and holds the ultrasonic receiver 22 of the ultrasonic sensor 20 and the laser displacement meter 50 (the laser irradiator 51 and the laser receiver 52). The holder 60 has an opening 61 on one end face (face facing to the electrode 10; the top face in FIG. 2).

The opening 61 is formed by boring the surface of the holder 60 toward the inner portion from the one end face as the same as the opening 41. The opening 61 is formed as a semi-sphere, and has the ultrasonic receiver 22 in the center thereof. The laser irradiator 51 and the laser receiver 52 are arranged either side of the ultrasonic receiver 22, and slope along the shape of the opening 61.

Hereby, the ultrasonic waves that are transmitted from the ultrasonic oscillator 21 and penetrate the electrode 10 reflect on the inner surface of the semi-sphere opening 61 and are concentrated on the center, whereby the ultrasonic waves are received excellently by the ultrasonic receiver 22 without dispersing. Additionally, the ultrasonic sensor 20 and the laser displacement meter 50 can measure the coated mass [$g/cm^2$] and the coated thickness [μm] of the same part of the lower side compound 12.

As mentioned above, the ultrasonic sensor 20 is composed of the ultrasonic oscillator 21 of the upper sensor 2 and the ultrasonic receiver 22 of the lower sensor 3. The ultrasonic sensor 20 measures the coated mass [$g/cm^2$] of the compounds 12. Moreover, the laser displacement meter 30 is composed of the laser irradiator 31 and the laser receiver 32 of the upper sensor 2, and the laser displacement meter 50 is composed of the laser irradiator 51 and the laser receiver 52 of the lower sensor 3. The laser displacement meter 30 measures the coated thickness [μm] of the upper side compound 12, and the laser displacement meter 50 measures the coated thickness [μm] of the lower side compound 12.

In detail, the detecting apparatus 1 has the ultrasonic sensor 20 and the two laser displacement meters 30, 50, and measures the coated thickness [μm] of the compounds 12 (total of the coated thickness of the upper side compound 12 and the coated thickness of the lower side compound 12) with the two laser displacement meters 30, 50 at the same time that the apparatus measures the coated mass [$g/cm^2$] of the compounds 12 with the ultrasonic sensor 20.

In the measurement of the coated mass [$g/cm^2$] and the coated thickness [μm] of the compounds 12, it is desirable to select the measurement means that has a good resolution according to measurement items while considering an accuracy, an influence of disturbance and the like. Concretely, it is desirable for the measurement of the coated mass [$g/cm^2$] of the compounds 12 to use an ultrasonic through beam sensor, and it is desirable for the measurement of the coated thickness [μm] of the compounds 12 to use a laser displacement meter.

Moreover, the holder 40 of the upper sensor 2 and the holder 60 of the lower sensor 3 have the semi-sphere openings 41, 61 respectively, and the ultrasonic sensor 20 and the laser displacement meters 30, 50 are arranged in the semi-sphere openings 41, 61.

Hereby, the ultrasonic waves transmitted from the ultrasonic oscillator 21 are concentrated efficiently, whereby the ultrasonic waves are transmitted to the desired part of the electrode 10 without dispersing. Additionally, the ultrasonic waves that penetrate the electrode 10 are concentrated efficiently, whereby the ultrasonic waves are received excellently by the ultrasonic receiver 22 without dispersing. In a word, the ultrasonic sensor 20 can transmit and receive the ultrasonic waves excellently.

Therefore, the ultrasonic sensor 20 can measure the coated mass [$g/cm^2$] of the compounds 12 with great accuracy (high S/N).

Additionally, the ultrasonic sensor 20 and the laser displacement meters 30, 50 can measure the coated mass [$g/cm^2$] and the coated thickness [μm] of the same part of the compounds 12 at the same time.

Therefore, the measurement of the coated mass [$g/cm^2$] of the compounds 12 by the ultrasonic sensor 20, and the measurement of the coated thickness [μm] of the compounds 12 by the laser displacement meters 30, 50 can be performed at the same time, and can be operated efficiently.

With reference to FIG. 2, the evaluation of the evenness of the compounds 12 by the evaluation device 5 is described below.

The evaluation device 5 connects electrically with the sensors 2, 3, obtains the coated mass [$g/cm^2$] and the coated thickness [μm] of the compounds 12 measured by the sensors, and evaluates the evenness of the compounds 12 on the basis of preset thresholds for evaluation.

Here, "the evenness" of the compounds 12 is a barometer whether the compounds 12 are coated on the collector 11 such that the multiple materials such as the active material, the conductive additive, and the binder are mixed evenly in the compounds 12, and is represented by using concrete numerical value such as the coated mass [$g/cm^2$], the coated thickness [μm] and the like.

As shown in FIG. 2, the sensors 2, 3 continuously measure the coated mass [$g/cm^2$] and the coated thickness [μm] of each of a plurality of parts of the compounds 12 in the electrode 10 conveyed by the conveyor (not shown) such as a roller or the like, while moving reciprocally within the prescribed range along the width direction of the electrode 10 (the range of the electrode 10 on which the compounds 12 are coated). The coated mass [$g/cm^2$] and the coated thickness [μm] of the compounds 12 measured by the sensors 2, 3 are sent to the evaluation device 5.

The evaluation device 5 calculates a mass per unit volume (hereinafter called "coated density") [$g/cm^3$] of the prescribed part of the compounds 12 from the coated mass [$g/cm^2$] and the coated thickness [μm] of the compounds 12 sent from the sensors 2, 3.

The coated density [$g/cm^3$] of the compounds 12 is calculated from a following formula 1.

$$\text{Coated Density}[g/cm^3] = \text{Coated Mass}[g/cm^2] / \text{Coated Thickness}[\mu m] \qquad \text{[formula 1]}$$

The evaluation device 5 determines quality of the compounds 12 by comparing the coated density [$g/cm^3$] of the compounds 12 with a threshold for the evaluation preset. In detail, the coated density [$g/cm^3$] of the compounds 12 is regarded as the evenness of the compounds 12, and the evenness is evaluated on the basis of the coated density [$g/cm^3$].

As mentioned above, the coated density [$g/cm^3$] of the compounds 12 calculated from the coated mass [$g/cm^2$] of the compounds 12 measured by the ultrasonic sensor 20 and the coated thickness [μm] of the compounds 12 measured by the laser displacement meters 30, 50 is regarded as the evenness of the compounds 12.

Hereby, when the compounds 12 are judged as uneven, referring to the coated mass [$g/cm^2$] and the coated thickness [μm] of the compounds 12 enables a factor in the unevenness of the compounds 12 to be identified whether the unevenness of the compounds 12 is caused by a change of the thickness of the compounds 12, or by a change of the composing ratio of the multiple materials in the compounds 12.

Therefore, the evenness of the compounds 12 is guaranteed, and variation of a performance of the electrode 10 is reduced by feeding back the data regarding the evenness of the compounds 12 to a process that the compounds 12 are coated on the collector 11 in a manufacturing process of the electrode 10.

In addition to the evaluation for the coated density [$g/cm^3$] of the compounds 12, the evenness of the compounds 12 may be evaluated by comparing the coated mass [$g/cm^2$] and the coated thickness [μm] of the compounds 12 with thresholds for the evaluation preset.

Hereby, the evenness of the compounds 12 is evaluated more specifically.

Moreover, it is advantageous that the detecting apparatus 1 detects the evenness of the compounds 12 in the electrode 10 at the end of the manufacturing process of the electrode 10. In detail, it is advantageous that the detecting apparatus 1 detects the evenness of the compounds 12 after drying and pressing the compounds 12, because the coated mass [$g/cm^2$] and the coated thickness [$\mu m$] of the compounds 12 are not measured with great accuracy immediately after the compounds 12 are coated on the collector 11 owing to an influence of water contained in the compounds 12, the diluent and the like.

In the present embodiment, the detecting apparatus 1 has two laser displacement meters, but the apparatus may have one laser displacement meter. In this case, the detecting apparatus 1 detects only an electrode that the compound 12 is coated on a single side face of the collector 11.

INDUSTRIAL APPLICABILITY

The present invention is applicable to an apparatus of detecting manufacturing accuracy of an electrode of a battery manufactured in a manufacturing process of the electrode, especially an apparatus that continuously detects the electrode in a line of the manufacturing process of the electrode.

The invention claimed is:

1. A detecting apparatus for detecting an evenness of a compound coated on an electrode of a battery, comprising:
   a first sensor for measuring a mass per unit area at any point along the compound;
   a second sensor for measuring a thickness at any point along the compound;
   a holder for holding the first and second sensors; and
   an evaluation device for evaluating the evenness of the compound,
   wherein the first and second sensors measure the mass per unit area and thickness at a same point along the compound at the same time, and
   wherein the evaluation device evaluates the evenness of the compound on the basis of the measured mass per unit area and thickness.

2. The detecting apparatus according to claim 1,
   wherein the holder has an opening formed as a semi-sphere on a surface thereof facing to the electrode, and
   wherein the first and second sensors are arranged in the opening.

3. The detecting apparatus according to claim 1,
   wherein the evaluation device evaluates the evenness of the compound by comparing a coated density calculated from the measured mass per unit area and thickness with a threshold.

4. The detecting apparatus according to claim 3,
   wherein the evaluation device evaluates the evenness of the compound by comparing the measured mass per unit area and thickness with thresholds in addition to comparing the coated density.

5. The detecting apparatus according to claim 1,
   wherein the first sensor is an ultrasonic through beam sensor, and
   wherein the second sensor is a laser displacement meter.

* * * * *